United States Patent
Zhang

(10) Patent No.: US 10,174,736 B2
(45) Date of Patent: Jan. 8, 2019

(54) EMERGENCY STARTING DEVICE AND EMERGENCY STARTING METHOD

(71) Applicant: Lei Zhang, Ningbo (CN)

(72) Inventor: Lei Zhang, Ningbo (CN)

( * ) Notice: Subject to any disclaimer, the term of this patent is extended or adjusted under 35 U.S.C. 154(b) by 0 days.

(21) Appl. No.: 14/443,021

(22) PCT Filed: May 7, 2015

(86) PCT No.: PCT/CN2015/078477
§ 371 (c)(1),
(2) Date: Feb. 28, 2017

(87) PCT Pub. No.: WO2016/161687
PCT Pub. Date: Oct. 13, 2016

(65) Prior Publication Data
US 2017/0191459 A1    Jul. 6, 2017

(30) Foreign Application Priority Data
Apr. 10, 2015    (CN) .......................... 2015 1 0169078

(51) Int. Cl.
*H02J 7/00*    (2006.01)
*F02N 11/14*    (2006.01)
(Continued)

(52) U.S. Cl.
CPC ............ *F02N 11/14* (2013.01); *H02J 7/0054* (2013.01); *H02J 7/345* (2013.01); *F02N 11/087* (2013.01);
(Continued)

(58) Field of Classification Search
USPC ....................................................... 320/105
See application file for complete search history.

(56) References Cited

U.S. PATENT DOCUMENTS 5,793,185 A * 8/1998 Prelec ................. H01M 2/1072
320/104
6,242,887 B1 * 6/2001 Burke ................. F02N 11/0866
320/104
(Continued)

FOREIGN PATENT DOCUMENTS

CN    2855817 Y    1/2007
CN    101161498 A    4/2008
(Continued)

OTHER PUBLICATIONS

Machine Translation of CN203387214.*

*Primary Examiner* — Samuel Berhanu
(74) *Attorney, Agent, or Firm* — Blank Rome LLP

(57) ABSTRACT

The present invention provides an emergency starting device, including a first output end and a second output end, wherein the first output end is used for being connected to a positive electrode of an accumulator battery in an engine starting system and the second output end is used for being connected to a negative electrode of the accumulator battery; the device includes a super-capacitor, a controller and a DC-DC booster circuit, wherein the controller receives first electrical signal from the accumulator battery and electrically connects the super-capacitor and the accumulator battery to start the engine with energy stored in the super-capacitor when the first electrical signal changes suddenly, the DC-DC booster circuit increases the output voltage of the accumulator battery to charge the super-capacitor. The invention further provides an emergency starting method accordingly. By using the super-capacitor, the controller and the DC-DC booster circuit the invention fits in various severe environments and can start an engine in emergency permanently and effectively.

7 Claims, 4 Drawing Sheets

(51) Int. Cl.
*H02J 7/34* (2006.01)
*F02N 11/08* (2006.01)
*F02N 11/12* (2006.01)

(52) U.S. Cl.
CPC .......... *F02N 11/0866* (2013.01); *F02N 11/12* (2013.01); *F02N 2011/0885* (2013.01); *F02N 2011/0888* (2013.01); *F02N 2200/043* (2013.01); *F02N 2200/046* (2013.01)

(56) References Cited

U.S. PATENT DOCUMENTS

| | | | |
|---|---|---|---|
| 6,329,797 | B1 | 12/2001 | Bluemel et al. |
| 6,803,743 | B2 * | 10/2004 | George ................. H02J 7/0034 320/105 |
| 2002/0041174 | A1 * | 4/2002 | Purkey .................... F02N 11/14 320/103 |
| 2003/0184258 | A1 * | 10/2003 | VonderHaar ........... F02N 11/14 320/103 |
| 2005/0099009 | A1 | 5/2005 | Spellman et al. |
| 2005/0258797 | A1 * | 11/2005 | Hung .................... H02J 7/0054 320/105 |
| 2008/0013224 | A1 * | 1/2008 | Kim ....................... H02J 7/0029 361/16 |
| 2008/0087479 | A1 | 4/2008 | Kang |
| 2011/0288705 | A1 * | 11/2011 | Kawasaki ........... B60L 11/1803 701/22 |
| 2014/0138960 | A1 * | 5/2014 | Huang .................... F02N 11/14 290/38 R |

FOREIGN PATENT DOCUMENTS

| | | |
|---|---|---|
| CN | 102691607 A | 9/2012 |
| CN | 202978396 U | 6/2013 |
| CN | 103441561 A | 12/2013 |
| CN | 203381507 U | 1/2014 |
| CN | 203387214 U | 1/2014 |
| EP | 0390398 A1 | 10/1990 |
| EP | 0974492 A2 | 1/2000 |
| JP | 2002195139 A | 7/2002 |
| WO | WO-2008/124342 A1 | 10/2008 |
| WO | WO-2014/200697 A1 | 12/2014 |

\* cited by examiner

EMERGENCY STARTING DEVICE AND EMERGENCY STARTING METHOD

FIELD OF THE INVENTION

The present invention relates to emergency starting technique for an engine, and more particularly, to an emergency starting device and an emergency starting method.

DESCRIPTION OF THE PRIOR ART

Starting system is used for starting an engine which can be a gasoline engine or a diesel engine. That is to say, it makes an idle engine work. Nowadays, almost all automobile engines and some small-sized farm machinery engines use electrical starting system, wherein accumulator battery is a critical component.

To start an engine, the accumulator battery should provide a high starting current, which is generally in the range of 200-800 Amp. While the performance of the accumulator battery during high rate discharging or in a cold environment is so poor that it may not able to provide a current high enough to start the engine. In addition, due to the performance degradation, the accumulator battery outputs a drastic changing voltage which may power down the starting system and thus the engine can not be started normally. In this case, an emergency starting device is needed. With its two output ends being respectively connected to the two output ends of the accumulator battery, the emergency starting device, which generally includes a battery such as lead-acid battery or lithium battery, substitutes the accumulator battery to output the starting current to start the engine. But the existing emergency devices are usually bulk and heavy, and the batteries in them are same with the accumulator battery used in the automobile, which has only 2-3 years's lifetime. They don't function well in cold environment or with insufficient voltage, thus scheduled maintenance is needed to keep them effective.

Therefore, the skilled person in the art have been trying to develop an emergency starting device and an emergency starting method applicable to automobile engines and some farm machinery engines in emergency.

SUMMARY OF THE INVENTION

Given the drawbacks in the prior art, on the first aspect, the invention aims to provide an emergency starting device and an emergency starting method to start the engine in emergency with the energy stored in a super-capacitor thereof.

To realize the above purpose, the invention provides an emergency starting device, including a first output end and a second output end, wherein the first output end is used for being connected to a positive electrode of an accumulator battery in an engine starting system and the second output end is used for being connected to a negative electrode of the accumulator battery, characterized in that, the device includes a super-capacitor and a controller, wherein the super-capacitor has energy stored in it, the controller receives an electrical signal from the accumulator battery and electrically connects the super-capacitor and the accumulator battery to start the engine with the energy when the electrical signal undergoes a sudden change.

Optionally, the negative electrode of the accumulator battery is grounded, the electrical signal is a voltage at the positive electrode of the accumulator battery, and the controller electrically connects the super-capacitor and the accumulator battery when the voltage decreases suddenly.

Further, the voltage decreases at a rate of no less than 2V/s.

Optionally, the negative electrode of the accumulator battery is grounded, the electrical signal is a current at the positive electrode of the accumulator battery, and the controller electrically connects the super-capacitor and the accumulator battery when the current increases suddenly.

Further, the current increases at a rate which is not less than 20 A/s.

Further, the emergency starting device includes a normally open relay, via which one end of the super-capacitor is connected to the positive electrode of the accumulator battery, and the other end of the super-capacitor is grounded; the controller closes the relay to electrically connect the super-capacitor and the accumulator battery when the electrical signal undergoes a sudden change.

Further, the controller receives an electrical signal from the super-capacitor and calculates the energy stored in the super-capacitor according to the electrical signal from the super-capacitor; the controller sends out an indicating signal when the energy is insufficient to start the engine.

Further, the electrical signal from the super-capacitor is a voltage at a non-grounded end of the super-capacitor.

Further, the controller is equipped with a switch; the controller functions when the switch is on, the controller does not function when the switch is off.

The invention further provides an emergency starting method used when the starting system cannot start an engine, characterized in that the method includes the following steps:
using a super-capacitor, which has energy stored in it;
using a controller, which receives an electrical signal from an accumulator battery in the starting system and electrically connects the super-capacitor and the accumulator battery to start the engine with the energy when the electrical signal changes suddenly.

Further, a negative electrode of the accumulator battery is grounded;
the electrical signal is a voltage at a positive electrode of the accumulator battery, and the controller electrically connects the super-capacitor and the accumulator battery when the voltage decreases suddenly; or
the electrical signal is a current at a positive electrode of the accumulator battery, and the controller electrically connects the super-capacitor and the accumulator battery when the current increases suddenly.

Further, one end of the super-capacitor is connected to the positive electrode of the accumulator battery via a normally open relay, and the other end of the super-capacitor is grounded; the controller closes the relay to electrically connect the super-capacitor and the accumulator battery when the electrical signal changes suddenly.

Further, the controller receives an electrical signal from the super-capacitor and calculates the energy stored in the super-capacitor according to the electrical signal from the super-capacitor; the controller sends out an indicating signal when the energy is insufficient to start the engine; the electrical signal from the super-capacitor is a voltage at a non-grounded end of the super-capacitor.

On the second aspect, the invention aims to provide an emergency starting device and an emergency starting method, by using the super-capacitor and a DC-DC booster circuit, to charge the super-capacitor with the remaining energy in the accumulator battery of the starting system and to start the engine with the energy in the super-capacitor in emergency.

To realize the purpose, the invention provides an emergency starting device, including a first output end and a second output end, wherein the first output end is used for being connected to a positive electrode of an accumulator battery in an engine starting system and the second output end is used for being connected to a negative electrode of the accumulator battery, characterized in that, the device includes a super-capacitor, a controller and a DC-DC booster circuit, wherein the DC-DC booster circuit is connected between the super-capacitor and the accumulator battery, the DC-DC booster circuit increases the output voltage of the accumulator battery to charge the super-capacitor; the controller receives a first electrical signal from the accumulator battery and electrically connects the super-capacitor and the accumulator battery to start the engine with energy stored in the super-capacitor when the first electrical signal changes suddenly.

Optionally, the negative electrode of the accumulator battery is grounded, the first electrical signal is a voltage at the positive electrode of the accumulator battery, and the controller electrically connects the super-capacitor and the accumulator battery when the voltage decreases suddenly.

Further, the voltage decreases at a rate which is not less than 2V/s.

Optionally, the negative electrode of the accumulator battery is grounded, the first electrical signal is a current at the positive electrode of the accumulator battery, and the controller electrically connects the super-capacitor and the accumulator battery when the current increases suddenly.

Further, the current increases at a rate which is not less than 20 A/s.

Further, the emergency starting device includes a normally open relay, via which one end of the super-capacitor is connected to the positive electrode of the accumulator battery, and the other end of the super-capacitor is grounded; the controller closes the relay to electrically connect the super-capacitor and the accumulator battery when the first electrical signal changes suddenly.

Further, the controller receives a second electrical signal from the super-capacitor and calculates the energy stored in the super-capacitor according to the electrical signal from the super-capacitor; the controller sends out an indicating signal when the energy is not enough to start the engine.

Further, the second electrical signal is a voltage at a non-grounded end of the super-capacitor.

Further, the controller is equipped with a switch; the controller functions when the switch is on, the controller does not function when the switch is off.

The invention further provides an emergency starting method used when the starting system cannot start an engine, characterized in that the method includes the following steps:
using a super-capacitor, a DC-DC booster circuit is connected between the super-capacitor and an accumulator battery in the starting system to increase an output voltage of the accumulator battery to charge the super-capacitor;
using a controller, which receives a first electrical signal from the accumulator battery and electrically connects the super-capacitor and the accumulator battery to start the engine with energy stored in the super-capacitor when the first electrical signal changes suddenly.

Further, the controller receives a second electrical signal from the super-capacitor and calculates the energy stored in the super-capacitor according to the second electrical signal; the controller electrically connects the super-capacitor and the accumulator battery via the DC-DC booster circuit when the energy is insufficient to start the engine, so that the supper-capacitor can be charged by the accumulator battery with an increased voltage which is increased by the DC-DC booster circuit.

Further, a negative electrode of the accumulator battery is grounded;
the first electrical signal is a voltage at a positive electrode of the accumulator battery, and the controller electrically connects the super-capacitor and the accumulator battery when the voltage decreases suddenly; or
the first electrical signal is a current at a positive electrode of the accumulator battery, and the controller electrically connects the super-capacitor and the accumulator battery when the current increases suddenly.

On the third aspect, the invention aims to provide an emergency starting device and an emergency starting method to start the engine in emergency by using a super-capacitor and a battery pack, wherein the engine is started with the energy in the super-capacitor; and to charge the super-capacitor with the remaining energy in the accumulator battery of the starting system by using a DC-DC booster circuit when the energy of the super-capacitor is insufficient to start the engine and then start the engine with the energy in the super-capacitor in emergency.

To realize the above purpose, the invention provides an emergency starting device, including a first output end and a second output end, wherein the first output end is used for being connected to a positive electrode of an accumulator battery in an engine starting system and the second output end is used for being connected to a negative electrode of the accumulator battery, characterized in that, the device includes a super-capacitor, a controller and a battery pack, wherein the battery pack is connected to the super-capacitor to charge the super-capacitor; the controller receives a first electrical signal from the accumulator battery and electrically connects the super-capacitor and the accumulator battery to start the engine with the energy stored in the super-capacitor when the first electrical signal changes suddenly.

Optionally, the negative electrode of the accumulator battery is grounded, the first electrical signal is a voltage at the positive electrode of the accumulator battery, and the controller electrically connects the super-capacitor and the accumulator battery when the voltage decreases suddenly.

Further, the voltage decreases at a rate of no less than 2V/s.

Optionally, the negative electrode of the accumulator battery is grounded, the first electrical signal is a current at the positive electrode of the accumulator battery, and the controller electrically connects the super-capacitor and the accumulator battery when the current increases suddenly.

Further, the current increases at a rate of no less than 20 A/s.

Optionally, the emergency starting device further includes a first normally open relay and a second normally open relay, one end of the super-capacitor is connected to the positive electrode of the accumulator battery via the first relay, and the other end of the super-capacitor is grounded; a positive electrode of the battery pack is connected to a non-grounded end of the super-capacitor via the second relay, a negative electrode of the battery pack is grounded; the controller closes the first relay to electrically connect the super-capacitor and the accumulator battery when the first electrical signal changes suddenly.

Optionally, the emergency starting device further includes a DC-DC booster circuit, the DC-DC booster circuit is connected between the super-capacitor and the battery pack and used for increasing an output voltage of the battery pack to charge the super-capacitor.

Further, the emergency starting device includes a first normally open relay, a second normally open relay and a third normally open relay, one end of the super-capacitor is connected to the positive electrode of the accumulator battery via the first relay, and the other end of the super-capacitor is grounded; a positive electrode of the battery pack is connected to a non-grounded end of the super-capacitor via the third relay and the DC-DC booster circuit, a negative electrode of the battery pack is grounded; series-connected second relay and DC-DC booster circuit are connected to the first relay in parallel; the controller closes the first relay to electrically connect the super-capacitor and the accumulator battery when the first electrical signal changes suddenly.

Optionally, the controller further receives a second electrical signal from the super-capacitor and calculates the energy stored in the super-capacitor according to the second electrical signal; the controller closes the second relay when the energy is insufficient to start the engine Optionally, the controller further receives a second electrical signal from the super-capacitor and calculates the energy stored in the super-capacitor according to the second electrical signal; the controller closes the third relay when the energy is insufficient to start the engine; after the third relay is closed,
the controller closes the first relay and opens the third relay to electrically connect the super-capacitor and the accumulator battery when the energy is sufficient to start the engine and the first electrical signal changes suddenly; the controller closes the second relay and opens the third relay when the energy is still insufficient to start the engine after a preset time interval; and after the second relay is closed,
the controller closes the first relay and opens the second relay to electrically connect the super-capacitor and the accumulator battery when the energy is sufficient to start the engine and the first electrical signal changes suddenly; the controller sends out an indicating signal when the energy is still insufficient to start the engine after a preset time interval.

Further, the battery pack is an 18650 lithium battery pack.

Further, the second electrical signal is a voltage at a non-grounded end of the super-capacitor.

The invention further provides an emergency starting method used when the starting system cannot start an engine, characterized in that the method includes the following steps:
using a super-capacitor and a battery pack, the battery pack is connected to the super-capacitor and is used for charging the super-capacitor;
using a controller, which receives a first electrical signal from an accumulator battery in the starting system and electrically connects the super-capacitor and the accumulator battery to start the engine with energy stored in the super-capacitor when the first electrical signal changes suddenly.

Further, a negative electrode of the accumulator battery is grounded;
the first electrical signal is a voltage at a positive electrode of the accumulator battery, and the controller electrically connects the super-capacitor and the accumulator battery when the voltage decreases suddenly; or
the first electrical signal is a current at a positive electrode of the accumulator battery, and
the controller electrically connects the super-capacitor and the accumulator battery when the current increases suddenly.

Further, one end of the super-capacitor is connected to the positive electrode of the accumulator battery via a first normally open relay, and the other end of the super-capacitor is grounded; a positive electrode of the battery pack is connected to a non-grounded end of the super-capacitor via a second normally open relay, a negative electrode of the battery pack is grounded; the controller closes the first relay to electrically connect the super-capacitor and the accumulator battery when the first electrical signal changes suddenly.

The invention further provides an emergency starting method used when the starting system cannot start an engine, characterized in that the method includes the following steps:
using a super-capacitor, a battery pack and a DC-DC booster circuit, the battery pack is connected to series-connected DC-DC booster circuit and super-capacitor in parallel;
using a controller, which receives a first electrical signal from an accumulator battery in the starting system and electrically connects the super-capacitor and the accumulator battery to start the engine with energy stored in the super-capacitor when the first electrical signal changes suddenly.

Further, a negative electrode of the accumulator battery is grounded;
the first electrical signal is a voltage at a positive electrode of the accumulator battery, and the controller electrically connects the super-capacitor and the accumulator battery when the voltage decreases suddenly; or
the first electrical signal is a current at a positive electrode of the accumulator battery, and the controller electrically connects the super-capacitor and the accumulator battery when the current increases suddenly.

Further, one end of the super-capacitor is connected to the positive electrode of the accumulator battery via a first normally open relay, and the other end of the super-capacitor is grounded; a positive electrode of the battery pack is connected to a non-grounded end of the super-capacitor via a third normally open relay and the DC-DC booster circuit, a negative electrode of the battery pack is grounded; series-connected second normally open relay and DC-DC booster circuit are connected to the first relay in parallel;
the controller further receives a second electrical signal from the super-capacitor and calculates the energy stored in the super-capacitor according to the second electrical signal; the controller closes the third relay when the energy is insufficient to start the engine; after the third relay is closed,
the controller closes the first relay and opens the third relay to electrically connect the super-capacitor and the accumulator battery when the energy is sufficient to start the engine and the first electrical signal changes suddenly; the controller closes the second relay and opens the third relay when the energy is still insufficient to start the engine after a preset time interval; and after the second relay is closed,
the controller closes the first relay and opens the second relay to electrically connect the super-capacitor and the accumulator battery when the energy is sufficient to start the engine and the first electrical signal changes suddenly; the controller sends out an indicating signal when the energy is still insufficient to start the engine after a preset time interval.

Super-capacitor is a novel energy-storage device, which can release a current of hundreds to thousands amperes in a short moment. It will not be interfered by high current discharging or even short circuit, and has a charge-discharge cycle of more than 100 thousand times and a lifetime of more than ten years without any maintenance. It can be used in severe environment, such as extreme cold environment, without any environmental pollution. The emergency starting device and the emergency starting method of the invention use the super-capacitor and start the engine in emergency by utilizing the sudden change of the electrical signal at the electrodes of the accumulator battery when the engine starting system ignites and using the controller to receive the electrical signal and control the super-capacitor accordingly. Besides, by using the DC-DC booster circuit and/or chargeable battery pack such as 18650 lithium battery pack, the invention realizes charging the super-capacitor when necessary to satisfy the requirement of starting the engine.

Referencing now to the figures, the conception, detailed structure and induced technical effect of the present invention will be expounded for due understanding of the purpose, characterizations and effects of the present invention.

DETAILED DESCRIPTION OF THE PREFERRED EMBODIMENTS

The starting system in the following embodiments of the invention is a starting system for gasoline engine, whose starting voltage is generally of 12V and the output voltage of the accumulator battery in it should be of 13-15V. When the output voltage of the accumulator battery cannot meet the requirement due to the weather or the shortage of energy (or power) caused by energy loss, i.e. in emergency circumstances, the emergency starting device of the invention can be connected to the starting system and substitute the starting system, which is not able to start the engine normally, to start the engine.

Figure 1:
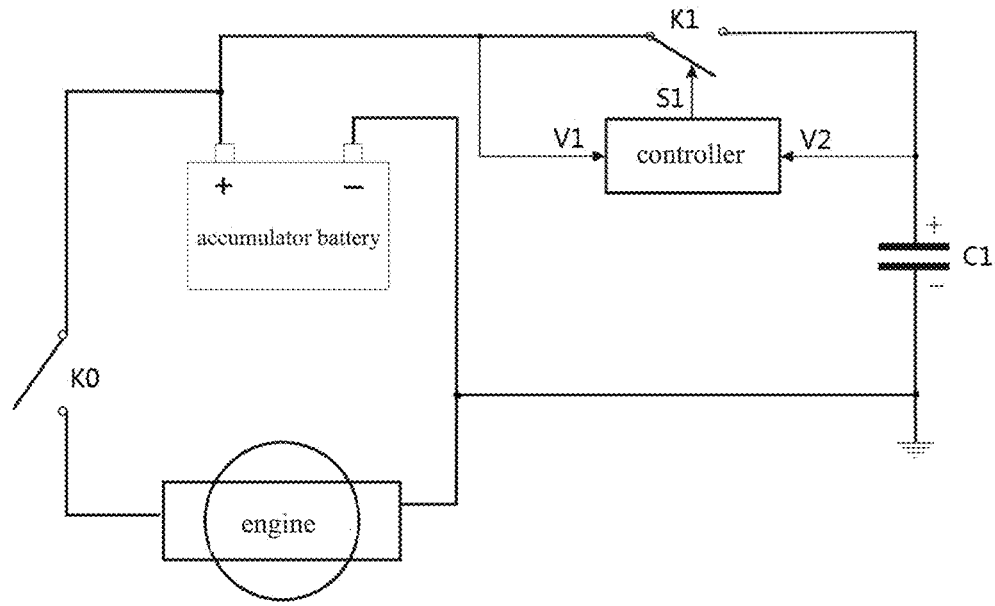
FIG. 1 shows the structure diagram of the emergency starting device of the invention and its connection to the engine starting system in the first preferred embodiment.

As shown in FIG. 1, in a first preferred embodiment of the invention, the emergency starting device of the invention has a first output end and a second output end, which are connected to the positive electrode and the negative electrode of the accumulator battery in the starting system respectively. The negative electrode of the accumulator battery is grounded.

The emergency starting device of the invention includes a super-capacitor C1, a controller and a relay K1. The super-capacitor is capable of storing energy (or power) and the energy stored in the super-capacitor C1 in this embodiment can start the engine in emergency. Specifically, one end (i.e. one plate) of the super-capacitor C1 is connected to the positive electrode of the accumulator battery via the relay K1, the other end (i.e. the other plate) is grounded. In practice, the super-capacitor C1 is multiple commercially available super-capacitors connected in series because the voltage of an individual super-capacitor is generally 2.5-2.7V while a voltage of 13V-15V is needed to start an engine whose starting voltage is 12V and a voltage of 26-28V is needed to start an engine whose starting voltage is 24V. The relay K1 is a normally open relay.

One output end of the controller is connected to the relay K1 to output a control signal S1 to control the on and off of the relay K1. One input end of the controller is connected to the positive electrode of the accumulator battery to receive the electrical signal form the accumulator battery in real time, for example to receive the signal 100 times per second. The signal can be a voltage V1 (as shown in FIG. 1), and can be a current as well. When the starting system ignites, that is when the switch K0 shown in FIG. 1 is closed, the output voltage and the current at the electrodes of the accumulator battery will undergo a sudden change. Thus the ignition of the starting system can be detected by receiving the signal. When the controller detects the ignition of the starting system, it sends out the control signal S1 to close the relay K1 to electrically connect the super-capacitor C1 and the accumulator battery, thereby the energy (or power) in the super-capacitor C1 can be outputted to start the engine.

In this embodiment, the controller receives the voltage V1 at the positive electrode of the accumulator battery and sends out the control signal S1 to close the relay K1 to electrically connect the super-capacitor C1 and the accumulator battery when it detects a sudden decrease of the voltage V1, for example the decreasing rate is not less than 2V/s.

In other embodiments, the controller can receive the current at the positive electrode of the accumulator battery by arranging a Hall element to the starting cable of the automobile, for example. The detected current at the cable is the current received at the positive electrode of the accumulator battery. The controller sends out the control signal S1 to close the relay K1 to electrically connect the super-capacitor C1 and the accumulator battery when it detects a sudden increase of the current, for example with an increasing rate of no less than 20 A/s.

In addition, another input end of the controller is connected to the non-grounded end of the super-capacitor C1 to receive the electrical signal from the super-capacitor C1 in real time, specifically to receive the voltage V2 at the non-grounded end of the super-capacitor, for example to receive the signal 100 times per second. The controller can calculate the energy (or power) stored in the super-capacitor C1 and determine whether the energy (or power) is sufficient to start the engine. Specifically, the starting current for a small car is about 200 A and with a duration time of 2 seconds. The energy needed for one starting can be calculated by the following equation:

$$E1 = V1 \times A \times T = 12 \times 200 \times 2/3600 = 1.22 \, W \cdot h$$

In the above equation, V1 is the end voltage of the accumulator battery with a unit of volt, A is the starting current of the engine with a unit of ampere, T is the duration time for one starting with a unit of hour, E1 is the energy with a unit of watt-hour. The equation to calculate the energy stored in the super-capacitor is:

$$E = 0.5 \times CV^2/3600$$

In the above equation, C is the capacitance of the super-capacitor C1 with a unit of Farad, V is the end voltage V2 of the super-capacitor C1 with a unit of volt, E is the energy with a unit of watt-hour.

For example, the stored energy calculated by the controller for the super-capacitor of 150 F with V2=2.5V is:

$$E=0.5\times150\times2.5\times2.5/3600=0.13 W\cdot h$$

The total energy stored in the super-capacitor C1 formed by N super-capacitors connected in series is N·E, so the controller can determine whether the energy stored in the super-capacitor C1 is sufficient to start the engine by comparing the total energy of the super-capacitor C1 to the energy E1 needed to start the engine once. Preferably, the total energy of the super-capacitor C1 should not be less than twice of the E1.

The controller determines that the energy (or power) of the super-capacitor C1 is not sufficient to start the engine and sends out an indicating signal when it determines that the total energy of the super-capacitor C1 is less than the energy E1 needed to start the engine once. The indicating signal can be an alarm sent out by a speaker controlled by the controller, light emitted by LED or picture and/or words presented on a screen, to indicate the user that the energy (or power) in the super-capacitor is insufficient and the super-capacitor needs to be charged.

Figure 4:
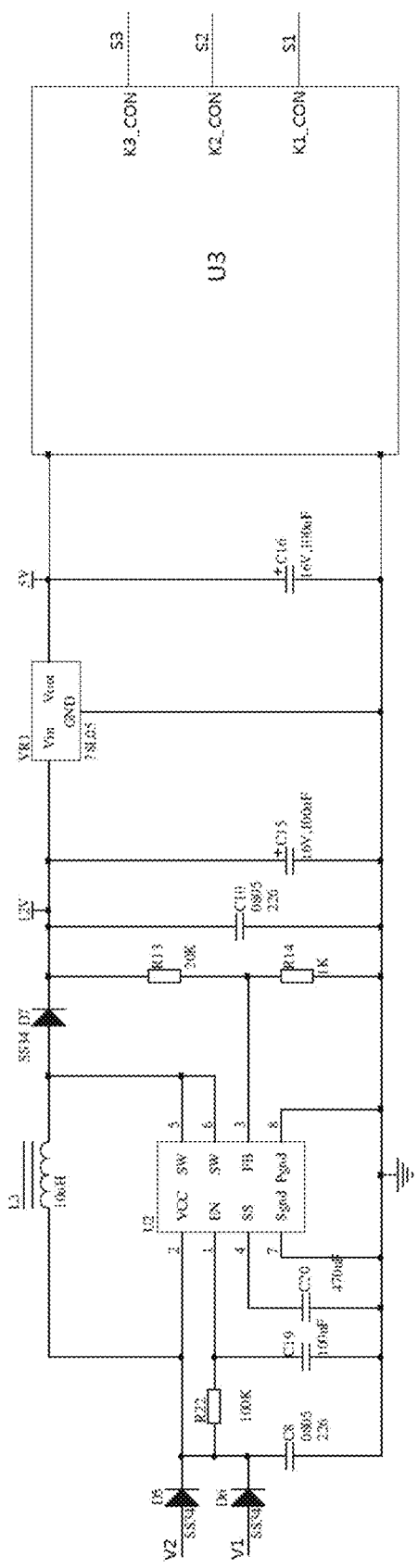
FIG. 4 is the circuit diagram of the controller in the emergency starting device of the invention shown in FIG. 3.

The controller in the embodiment includes chips, whose circuit is the same with the circuit of the controller shown in FIG. 4, except that the output ends K2_CON and K3_CON for outputting the control signals S2 and S3 are not needed. The detail will be discussed later.

Preferably, the controller is set to receive the voltage V2 immediately after the first output end and the second output end of the emergency starting device of the invention are connected to the positive electrode and the negative electrode of the accumulator battery in the starting system, to detect the energy of the super-capacitor C1.

In addition, the controller can be equipped with a switch, which generally is a button. When the switch is on, the controller functions and can receive signals, process signals and output signals. When the switch is off, the controller does not function. After the first output end and the second output end of the emergency starting device of the invention are connected to the positive electrode and the negative electrode of the accumulator battery in the starting system, the user turns on the switch of the controller, the controller will receive the voltage V2 in real time immediately to detect the energy in the super-capacitor C1.

Accordingly, the emergency starting method of the invention in the embodiment includes the following steps:
1. using the super-capacitor C1, which has energy stored in it;
2. using the controller, which receives the electrical signal from the accumulator battery in the starting system in real time and sends out the control signal S1 to the relay K1 to close the relay K1 when the electrical signal changes suddenly, to electrically connect the super-capacitor C1 and the accumulator battery to start the engine with the energy stored in the super-capacitor C1.

Wherein, the negative electrode of the accumulator battery is grounded, one end of the super-capacitor C1 is connected to the positive electrode of the accumulator battery via the relay K1, and the other end of the super-capacitor C1 is grounded. The electrical signal from the accumulator battery is the voltage V1 at its positive electrode. The controller receives the voltage V1 at a frequency of 100 times per second.

Further, the controller receives the electrical signal from the super-capacitor C1 in real time, which is the voltage V2 at the non-grounded end of the super-capacitor C1 specifically. The controller receives the voltage V2 at a frequency of 100 times per second. The controller calculates the energy stored in the super-capacitor C1 according to the voltage V2 and determines whether the energy is sufficient to start the engine. If the result is that the energy is sufficient to start the engine, the controller sends out the control signal S1 to the relay K1 when the electrical signal from the accumulator battery changed suddenly. If the result is that the energy is insufficient to start the engine, the controller sends out the indicating signal to indicate the user that the energy in the super-capacitor is insufficient and the super-capacitor needs to be charged.

Figure 2:
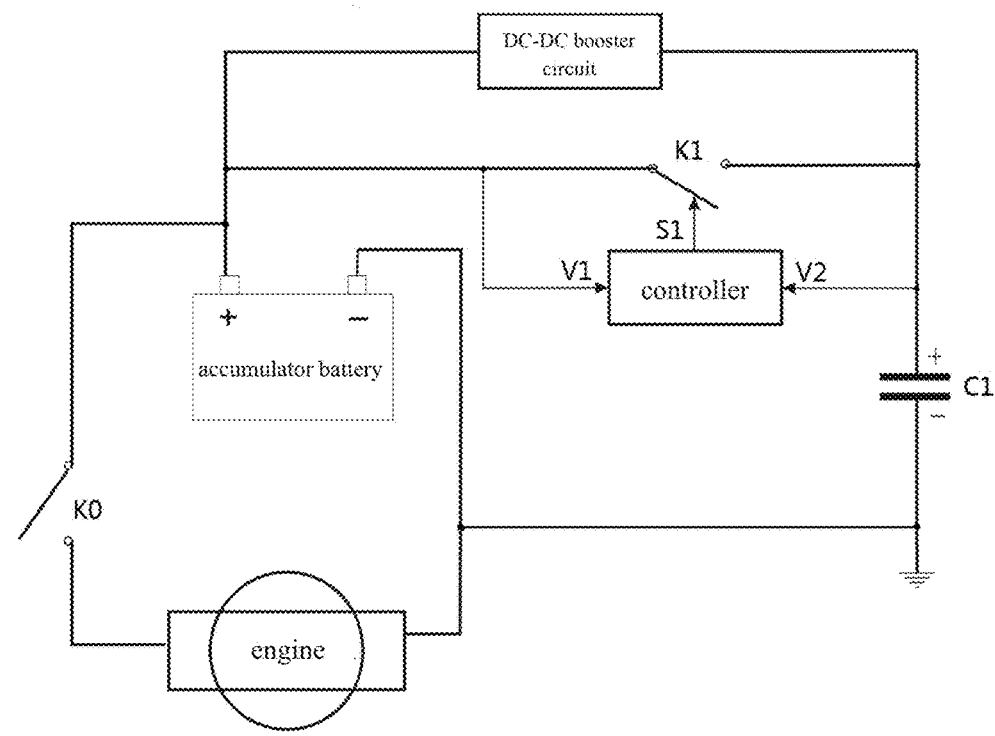
FIG. 2 shows the structure diagram of the emergency starting device of the invention and its connection to the engine starting system in the second preferred embodiment.

As shown in FIG. 2, in the second preferred embodiment of the invention, the emergency starting device of the invention has a first output end and a second output end, which are connected to the positive electrode and the negative electrode of the accumulator battery in the starting system respectively. The negative electrode of the accumulator battery is grounded.

The emergency starting device of the invention includes a super-capacitor C1, a controller, a relay K and a DC-DC booster circuit. Specifically, one end (i.e. one plate) of the super-capacitor C1 is connected to the positive electrode of the accumulator battery via the relay K1, the other end (i.e. the other plate) is grounded. The DC-DC booster circuit is connected to the relay K1 in parallel. Similarly in practice, the super-capacitor C1 is multiple commercially available super-capacitors connected in series. The relay K1 is a normally open relay.

The super-capacitor C1 in this embodiment is not required to have energy stored in it but can have energy charged into it with the remaining energy in the accumulator battery by the DC-DC booster circuit. When the engine cannot be started, the accumulator battery still has a voltage of 8-12V though it cannot perform high current discharging, thus it is possible to transfer the energy (or power) remained in the accumulator battery to the super-capacitor C1 by the DC-DC booster circuit. Preferably, the input current to the DC-DC booster circuit should be less than 20 A so the end voltage of the accumulator battery will not drop drastically.

One output end of the controller is connected to the relay K1 to output a control signal S1 to control the on and off of the relay K1. One input end of the controller is connected to the positive electrode of the accumulator battery to receive the electrical signal form the accumulator battery in real time. Same as the first embodiment, the electrical signal can be the voltage V1 (as shown in FIG. 2), and can be a current as well. The controller receives the voltage V1 at a frequency of 100 times per second. In addition, another input end of the controller is connected to one end of the super-capacitor C1, specifically to the non-grounded end of the super-capacitor C1, to receive the electrical signal from the super-capacitor C1 in real time, specifically to receive the voltage V2 at the non-grounded end of the super-capacitor C1. The controller receives the voltage V2 at a frequency of 100 times per second. The controller can calculate the energy (or power) stored in the super-capacitor C1 according to the voltage V2, and determine whether the energy (or power) is sufficient to start the engine.

When the starting system ignites, that is when the switch K0 shown in FIG. 2 is closed, the voltage and the current outputted at the electrodes of the accumulator battery will change suddenly. So the ignition of the starting system can be detected by receiving the electrical signal. The detection is the same as that described in the first embodiment, and will not be described here. When the controller detects the ignition of the starting system and determines that the energy (or power) in the super-capacitor C1 is sufficient to start the engine, it sends out the control signal S1 to close the relay K1 to electrically connect the super-capacitor C1 and the accumulator battery, thereby the energy (or power) in the super-capacitor C1 can be outputted to start the engine.

Since the energy (or power) remained in the accumulator battery is limited, it is possible that the energy in the super-capacitor which has been charged by the accumulator battery is still insufficient to start the engine. Under this circumstance, the controller will send out an indicating signal when it determines that the energy stored in the super-capacitor C1 is insufficient to start the engine after a preset time interval's detection, for example 5 minutes' detection. The indicating signal can be an alarm sent out by a speaker controlled by the controller, light emitted by LED or picture and/or words presented on a screen, to indicate the user that the energy (or power) in the super-capacitor is insufficient and the super-capacitor needs to be charged by an outer charger.

The controller in the embodiment has a same circuit as that of the previous embodiment, and will not be described here.

Preferably, the controller is set to receive the voltage V2 immediately after the first output end and the second output end of the emergency starting device of the invention are connected to the positive electrode and the negative electrode of the accumulator battery in the starting system, to detect the energy of the super-capacitor C1.

In addition, the controller can be equipped with a switch, which generally is a button. When the switch is on, the controller functions and can receive signals, process signals and output signals. When the switch is off, the controller does not function. After the first output end and the second output end of the emergency starting device of the invention are connected to the positive electrode and the negative electrode of the accumulator battery in the starting system, the user turns on the switch of the controller, the controller will receive the voltage V2 in real time immediately to detect the energy in the super-capacitor C1.

Accordingly, the emergency starting method of the invention in the embodiment includes the following steps:
1. using the super-capacitor C1, which is connected to the accumulator battery via the DC-DC booster circuit; the super-capacitor C1 is charged with the output voltage of the accumulator battery increased by the DC-DC booster circuit.
2. using the controller, which receives the electrical signal from the accumulator battery in the starting system in real time and sends out the control signal S1 to the relay K1 to close the relay K1 when the electrical signal changes suddenly, so as to electrically connects the super-capacitor C1 and the accumulator battery to start the engine with the energy stored in the super-capacitor C1.

Wherein, the negative electrode of the accumulator battery is grounded, one end of the super-capacitor C1 is connected to the positive electrode of the accumulator battery via the relay K1, and the other end of the super-capacitor C1 is grounded. The electrical signal from the accumulator battery is the voltage V1 at the positive electrode thereof. The controller receives the voltage V1 at a frequency of 100 times per second.

Further, the controller receives the electrical signal from the super-capacitor C1 in real time, which is the voltage V2 at the non-grounded end of the super-capacitor C1 specifically. The controller receives the voltage V2 at a frequency of 100 times per second. The controller calculates the energy stored in the super-capacitor C1 according to the voltage V2 and determines whether the energy is sufficient to start the engine. If the result is that the energy is sufficient to start the engine, the controller sends out the control signal S1 to the relay K1 when the electrical signal from the accumulator battery changes suddenly. If the result is that the energy is not enough to start the engine after a preset time interval's detection, for example 5 minutes' detection, the controller sends out the indicating signal to indicate the user that the energy in the super-capacitor is insufficient and the super-capacitor needs to be charged by an outer charger.

Figure 3:
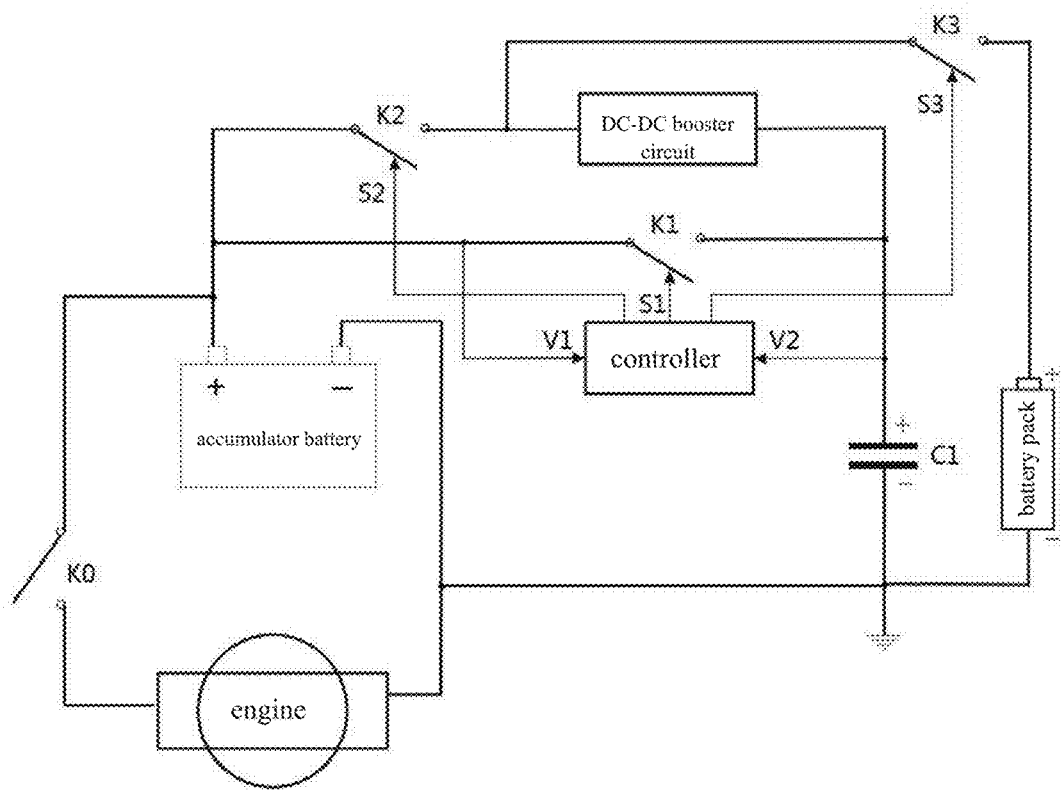
FIG. 3 shows the structure diagram of the emergency starting device of the invention and its connection to the engine starting system in the third preferred embodiment.

As shown in FIG. 3, in the third preferred embodiment of the invention, the emergency starting device of the invention has a first output end and a second output end, which are connected to the positive electrode and the negative electrode of the accumulator battery in the starting system respectively. The negative electrode of the accumulator battery is grounded.

The emergency starting device of the invention includes a super-capacitor C1, a controller, a first relay K1, a second relay K2, a third relay K3, a DC-DC booster circuit and a battery pack. Specifically, one end (i.e. one plate) of the super-capacitor C1 is connected to the positive electrode of the accumulator battery via the relay K1, the other end (i.e. the other plate) is grounded. The positive electrode of the battery pack is connected to the non-grounded end of the super-capacitor C1 via the third relay K3 and the DC-DC booster circuit, and its negative electrode is grounded. The DC-DC booster circuit is connected to the second relay K2 in series, and the series-connected DC-DC booster circuit and second relay K2 are connected to the first relay K1 in parallel. Similarly in practice, the super-capacitor C1 is multiple commercially available super-capacitors connected in series. The first relay K1, the second relay K2 and the third relay K3 are normally open relays. Preferably, the battery pack is a rechargeable battery pack, such as lead-acid battery pack, NI-MH battery pack, lithium battery pack and etc. More preferably, it is an 18650 lithium battery pack. The super-capacitor C1 in this embodiment is not required to have energy stored in it but can be charged by the battery pack. Since in the embodiment the battery pack is connected to the super-capacitor C1 via the third relay K3 and the DC-DC booster circuit, and the DC-DC booster circuit can increase the output voltage of the battery pack to charge the super-capacitor C1 when the third relay K3 is closed, the output voltage of the battery pack can be lower than the starting voltage. For example, the battery pack can be multiple 18650 lithium battery connected in parallel.

One output end of the controller is connected to the relay K1 to output a control signal S1 to control the on and off of the first relay K1, another output end of the controller is connected to the second relay K2 to output a control signal S2 to control the on and off of the second relay K2, and the third output end of the controller is connected to the third relay K3 to output a control signal S3 to control the on and off of the third relay K3. One input end of the controller is connected to the positive electrode of the accumulator battery to receive the first electrical signal from the accumulator battery in real time. Same as the first embodiment, the electrical signal can be the voltage V1 (as shown in FIG. 3), and can be a current as well. The controller receives the voltage V1 at a frequency of 100 times per second. In addition, another input end of the controller is connected to one end of the super-capacitor C1, specifically to the non-grounded end of the super-capacitor C1 to receive the second electrical signal from the super-capacitor C1 in real time, specifically to receive the voltage V2 at the non-grounded end of the super-capacitor C1. The controller receives the voltage V2 at a frequency of 100 times per second. The controller can calculate the energy (or power)

stored in the super-capacitor C1 according to the voltage V2, and determine whether the energy (or power) is sufficient to start the engine.

When the starting system ignites, that is when the switch K0 shown in FIG. 3 is closed, the voltage and the current outputted at the electrodes of the accumulator battery will change suddenly. So the ignition of the starting system can be detected by receiving the electrical signal. The detection is the same as that described in the first embodiment, and will not be described here.

When the controller detects the ignition of the starting system and determines that the energy (or power) in the super-capacitor C1 is sufficient to start the engine according to the voltage V2, it sends out the control signal S1 to close the first relay K1 to electrically connect the super-capacitor C1 and the accumulator battery, thereby the energy in the super-capacitor C1 can be outputted to start the engine. When the controller detects the ignition of the starting system and determines that the energy in the super-capacitor C1 is insufficient to start the engine according to the voltage V2 and the third relay K3 is open, it sends out the control signal S3 to close the third relay K3 to electrically connect the super-capacitor C1 and the battery pack via the DC-DC booster circuit, thereby the battery pack charges the super-capacitor C1. The controller keeps on calculating the energy in the super-capacitor C1 according to the voltage V2 in real time, and when it determines that the energy in the super-capacitor C1 is sufficient to start the engine, it sends out the control signal S1 to close the first relay K1 and stops sending out the control signal S3 to open the third relay K3 so as to electrically connect the super-capacitor C1 and the accumulator battery, thereby the energy in the super-capacitor C1 can be outputted to start the engine. If the controller determines that the energy stored in the super-capacitor C1 is still insufficient to start the engine after a preset time interval's detection, for example 5 minutes' detection since the third relay K3 is closed, and the second relay K2 is open, it sends out the control signal S2 to close the second relay K2 and stops sending out the control signal S3 to open the third relay K3 to electrically connect the super-capacitor C1 and the accumulator battery via the DC-DC booster circuit, thus the accumulator battery charges the super-capacitor C1. The controller keeps on calculating the energy in the super-capacitor C1 according to the voltage V2 in real time, and when it determines that the energy in the super-capacitor C1 is sufficient to start the engine, it sends out the control signal S1 to close the first relay K1 and stops sending out the control signal S2 to open the second relay K2 to electrically connect the super-capacitor C1 and the accumulator battery, thereby the energy in the super-capacitor C1 can be outputted to start the engine. If the controller determines that the energy stored in the super-capacitor C1 is still insufficient to start the engine after a preset time interval's detection, for example 5 minutes' detection since the second relay K2 is closed, it sends out an indicating signal to indicate the user that the energy in the super-capacitor is insufficient and the battery pack should be replaced or the super-capacitor and/or the battery pack should be charged by an outer charger.

The circuit of the controller in the embodiment is shown as FIG. 4. The controller includes a chip U3, a chip VR1, a chip U2 and several resistors, capacitors, diodes and a inductance, wherein the chip U3 is MA86E/L508, the chip VR1 is 78L05, the chip U2 is AX5201, the resistance values of the resistors R13. R14 and R22 are shown in the figure, the capacitance values of the capacitors C8, C9, C10, C15, C16 and C20 are shown in the figure, the inductance value of the inductance L3 is shown in the figure, the types of the diodes D5, D6 and D7 are shown in the figure, and the connection between all these elements are as shown in the figure. The two input ends of the controller receive the first electrical signal and the second electrical signal, i.e. voltage V1 and voltage V2, respectively. Its three output ends are the three output ports K1_CON, K2_CON and K3_CON of the chip U3, and are used for outputting control signals S1, S2 and S3.

The control signals S1, S2 and S3 are used for control the on and off of the first, the second and the third relays K1, K2 and K3. Specifically, the first, the second and the third relays K1, K2 and K3 are normally open relays. They will close when the control signals S1, S2 and S3 are loaded, and open when the control signals S1, S2 and S3 are unloaded. The circuit of the first, the second and the third relays K1, K2 and K3 in the embodiment are same, and will be described below taking the second relay K2 as the example.

Figure 5:
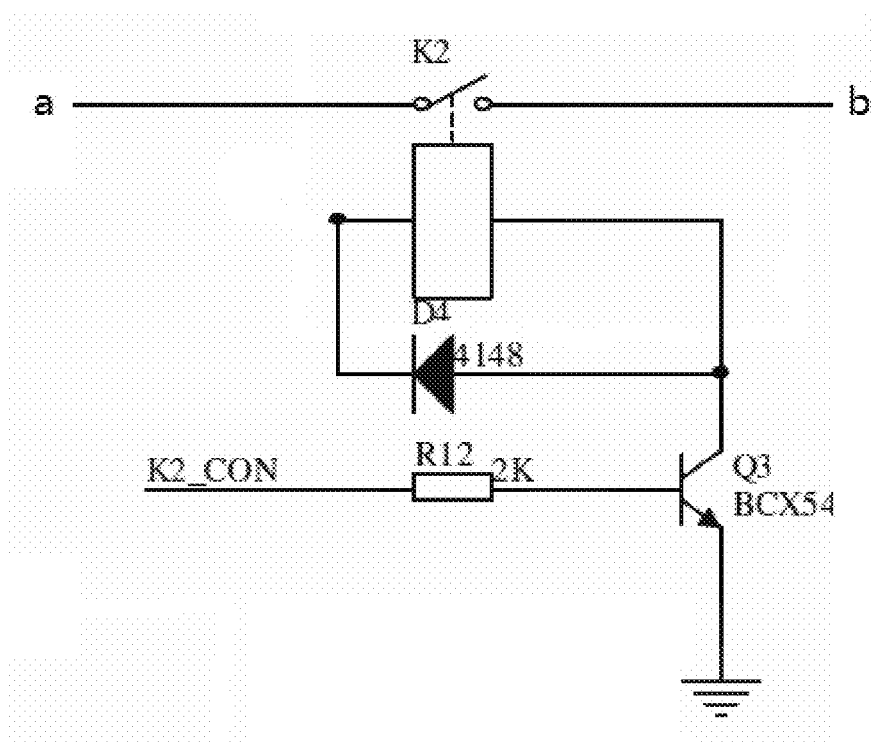
FIG. 5 is the circuit diagram of the second relay in the emergency starting device of the invention shown in FIG. 3.

Referring to FIG. 5, the two ends, a and b, of the second relay K2 are connected to the positive electrode and the negative electrode of the accumulator battery respectively. The second relay K2 is connected to the resistor R12, the transistor Q3 and the diode D4 in the way as shown in the figure. The resistor R12 is connected to the port K2_CON of the chip U3 of the controller to receive the control signal S2 from the controller. The types and values of the elements are shown in the figure and will be not described here.

Preferably, the controller is set to receive the voltage V2 when the first output end and the second output end of the emergency starting device of the invention are connected to the positive electrode and the negative electrode of the accumulator battery in the starting system, to detect the energy of the super-capacitor C1.

In addition, the controller can be equipped with a switch, which generally is a button. When the switch is on, the controller functions and can receive signals, process signals and output signals. When the switch is off, the controller does not function. After the first output end and the second output end of the emergency starting device of the invention are connected to the positive electrode and the negative electrode of the accumulator battery in the starting system, the user turns on the switch of the controller, the controller will immediately receive the voltage V2 in real time to detect the energy in the super-capacitor C1.

Accordingly, the emergency starting method of the invention in the embodiment includes the following steps:
1. using the super-capacitor C1, the battery pack and the DC-DC booster circuit, wherein the super-capacitor C1 is connected to the battery pack via the third relay K3 and the DC-DC booster circuit; the super-capacitor C1 is connected to the accumulator battery via the second relay K2 and DC-DC booster circuit; the DC-DC booster circuit is used for increasing the output voltage of the battery pack or the accumulator battery to charge the super-capacitor C1;
2. using the controller, which receives the first electrical signal from the accumulator battery in the starting system and the second electrical signal from the super-capacitor C1 in real time, and calculates the energy (or power) stored in the super-capacitor C1 according to the second electrical signal and determines whether the energy (or power) is sufficient to start the engine. When the controller detects the sudden change of the first electrical signal and determines that the energy in the super-capacitor C1 is sufficient to start the engine, the controller sends out the control signal S1 to close the first relay K1 to electrically connect the super-capacitor C1 and the accumulator battery, thus the energy in the super-capacitor C1 can be outputted to start the engine.

When the controller detects the sudden change of the first electrical signal and determines that the energy in the super-capacitor C1 is insufficient to start the engine, it sends out the control signal S3 to close the third relay K3 to electrically connect the super-capacitor C1 and the battery pack via the DC-DC booster circuit, thus the battery pack charges the super-capacitor C1. The controller keeps on calculating the energy in the super-capacitor C1 according to the second electrical signal in real time, and when it determines that the energy in the super-capacitor C1 is sufficient to start the engine, it sends out the control signal S1 to close the first relay K1 and stops sending out the control signal S3 to open the third relay K3, thus the energy in the super-capacitor C1 can be outputted to start the engine. If the controller determines that the energy stored in the super-capacitor C1 is still insufficient to start the engine after a preset time interval's detection, for example 5 minutes' detection since the third relay K3 is closed, and the second relay K2 is open, it sends out the control signal S2 to close the second relay K2 and stops sending out the control signal S3 to open the third relay K3 to electrically connect the super-capacitor C1 and the accumulator battery via the DC-DC booster circuit, thus the accumulator battery charges the super-capacitor C1. The controller keeps on calculating the energy in the super-capacitor C1 according to the voltage V2 in real time, and when it determines that the energy in the super-capacitor C1 is sufficient to start the engine, it sends out the control signal S1 to close the first relay K1 and stops sending out the control signal S2 to open the second relay K2, thus the energy in the super-capacitor C1 can be outputted to start the engine. If the controller determines that the energy stored in the super-capacitor C1 is still insufficient to start the engine after a preset time interval's detection, for example 5 minutes' detection since the second relay K2 is closed, it sends out an indicating signal to indicate the user that the energy in the super-capacitor is insufficient and the battery pack should be replaced or the super-capacitor and/or the battery pack should be charged by an outer charger.

Wherein the negative electrode of the accumulator battery is grounded, one end of the super-capacitor C1 is connected to the positive electrode of the accumulator battery via the first relay K1, and the other end of the super-capacitor C1 is grounded. The positive electrode of the battery pack is connected to the non-grounded end of the super-capacitor C1 via the third relay K3 and the DC-DC booster circuit, and its negative electrode is grounded. The series-connected second relay K2 and DC-DC booster are connected between the positive electrode of the accumulator battery and the non-grounded end of the super-capacitor C1. The first electrical signal is the voltage V1 at the positive electrode of the accumulator battery, and the second electrical signal is the voltage V2 at the non-grounded end of the super-capacitor C1. The controller receives the voltage V1 at a frequency of 100 times per second, and receives the voltage V2 at a frequency of 100 times per second.

The preferred embodiments of the invention have been described above in detail. It is to be understood that those skilled in the art may make changes or modifications based on the inventive concepts of the invention without any creative work. Accordingly, any technical solution that those skilled in the art conceived by way of logic analysis, reasoning or finite experiments, should be considered to be in the extent of protection as defined by the claims.

The invention claimed is:

1. An emergency starting device, for use when an engine starting system cannot start an engine, comprising a first output end and a second output end, wherein the first output end is, in use, connected to a positive electrode of an accumulator battery in the engine starting system and the second output end is, in use, connected to a negative electrode of the accumulator battery, wherein the device includes a super-capacitor, a controller and a DC-DC booster circuit, wherein
- the DC-DC booster circuit is arranged, in use, to be connected between the super-capacitor and the accumulator battery,
- the DC-DC booster circuit is arranged to increase the output voltage of the accumulator battery to charge the super-capacitor;
- the negative electrode of the accumulator battery is grounded;
- the controller is arranged to receives a first electrical signal from the accumulator battery;
the first electrical signal being a voltage at the positive electrode of the accumulator battery;
- wherein the controller is arranged to electrically connect the super-capacitor and the accumulator battery to start the engine with energy stored in the super-capacitor when the voltage decreases at a rate of no less than 2V/s;
- wherein the emergency starting device further includes a normally open relay, via which one end of the super-capacitor is connected to the positive electrode of the accumulator battery, and the other end of the super-capacitor is grounded; the controller closes the relay to electrically connect the super-capacitor and the accumulator battery when the first electrical signal changes suddenly;
- wherein the controller further receives a second electrical signal from the super-capacitor and calculates the energy stored in the super-capacitor according to the second electrical signal from the super-capacitor; the controller sends out an indicating signal when the energy is insufficient to start the engine.

2. An emergency starting device, for use when an engine starting system cannot start an engine, comprising a first output end and a second output end, wherein the first output end is, in use, connected to a positive electrode of an accumulator battery in the engine starting system and the second output end is, in use, connected to a negative electrode of the accumulator battery, wherein the device includes a super-capacitor, a controller and a DC-DC booster circuit, wherein
- the DC-DC booster circuit is arranged, in use, to be connected between the super-capacitor and the accumulator battery,
- the DC-DC booster circuit is arranged to increase the output voltage of the accumulator battery to charge the super-capacitor;
- the negative electrode of the accumulator battery is grounded;
- the controller is arranged to receive a first electrical signal from the accumulator battery, the first electrical signal is a current at the positive electrode of the accumulator battery; and
- the controller is arranged to electrically connects the super-capacitor and the accumulator battery to start the engine with energy stored in the super-capacitor when the current increases at a rate of no less than 20 A/s;
- wherein the emergency starting device further includes a normally open relay, via which one end of the super-capacitor is connected to the positive electrode of the accumulator battery, and the other end of the super-capacitor is grounded; the controller closes the relay to electrically connect the super-capacitor and the accumulator battery when the first electrical signal changes suddenly;

wherein the controller further receives a second electrical signal from the super-capacitor and calculates the energy stored in the super-capacitor according to the second electrical signal from the super-capacitor; the controller sends out an indicating signal when the energy is insufficient to start the engine.

3. The emergency starting device according to claim 1, wherein the second electrical signal is a voltage at a non-grounded end of the super-capacitor.

4. The emergency starting device according to claim 1, wherein the controller is equipped with a switch; the controller functions when the switch is on, the controller does not function when the switch is off.

5. An emergency starting method, used when a starting system cannot start an engine, the method comprising:

using a super-capacitor, a DC-DC booster circuit is connected between the super-capacitor and an accumulator battery in the starting system to increase an output voltage of the accumulator battery to charge the super-capacitor, and a negative electrode of the accumulator battery is grounded;

using a controller, which receives a first electrical signal from the accumulator battery, wherein:

(I) the first electrical signal is a voltage at a positive electrode of the accumulator battery; and the controller electrically connects the super-capacitor and the accumulator battery to start the engine with energy stored in the super-capacitor when the voltage decreases at a rate of no less than 2V/s; or (II) the first electrical signal is a current at the positive electrode of the accumulator battery; and the controller electrically connects the super-capacitor and the accumulator battery to start the engine with energy stored in the super-capacitor when the current increases at a rate of no less than 20 A/s;

wherein the controller further receives a second electrical signal from the super-capacitor and calculates the energy stored in the super-capacitor according to the second electrical signal; the controller electrically connects the super-capacitor to the accumulator battery via the DC-DC booster circuit when the energy is insufficient to start the engine, to have the super-capacitor charged by the output voltage of the accumulator battery increased by DC-DC booster circuit.

6. The emergency starting method according to claim 5, wherein the second electrical signal is a voltage at a non-grounded end of the super-capacitor.

7. The emergency starting method according to claim 6, wherein the controller is equipped with a switch; the controller functions when the switch is on, the controller does not function when the switch is off.

* * * * *